Jan. 18, 1955 W. LÖBBE 2,699,930
COAL PLANING MACHINE HEAD AND CUTTER ARRANGEMENT THEREON
Filed Sept. 30, 1950
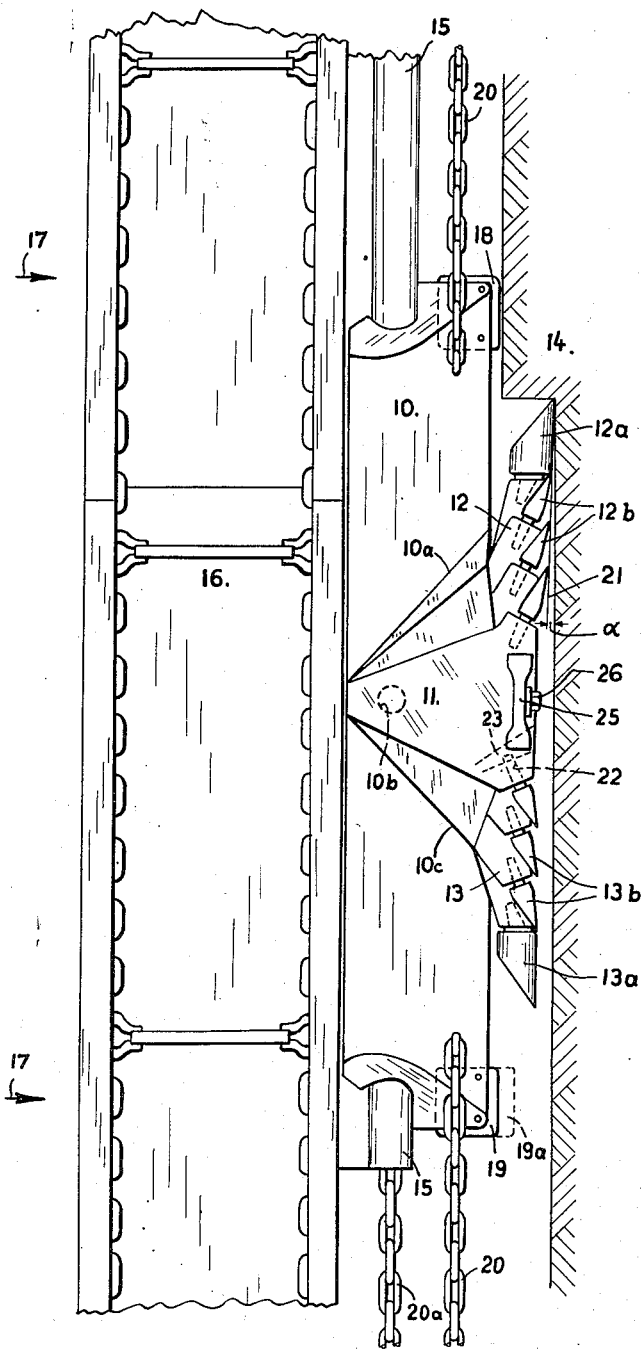
INVENTOR.
WILHELM LOBBE, DECEASED
BY ARMIN LOBBE, ADMINISTRATOR
BY Burgess and Dinklage
ATTORNEYS United States Patent Office 2,699,930
Patented Jan. 18, 1955

2,699,930

COAL PLANING MACHINE HEAD AND CUTTER ARRANGEMENT THEREON

Wilhelm Löbbe, deceased, late of Oberaden, Kreis Unna, Westphalia, Germany, by Armin Löbbe, administrator, Oberaden, Kreis Unna, Westphalia, Germany Application September 30, 1950, Serial No. 187,741

Claims priority, application Germany October 24, 1949

7 Claims. (Cl. 262—8)

This invention relates to a coal planing machine.

In the automatic extraction of coal, use is frequently made of a so-called coal planer which is guided at its rear side on a conveyor, the planer being drawn along the coal face by a tractive means. In this way, the planer scales off the actual cut from the face and loads the loosened coal into the conveyor. The greatest depth of cut is obtained when the planer frame slides along directly on the face, the cut then being equal to the distance of the planer cutting edge from the planer frame. Particularly with the use of uncontrolled compressed air pistons for the advancement of the conveyor over its entire length, the planer will always take a broad cut correponding to this distance since it must be forced through between the conveyor and the coal face.

According to the hardness and the solidity in the individual seams, the depth of cut cannot always be the same. Frequently, ore deposits, lumps of pyrites and the like also make it compulsory to select a smaller depth of cut and it is also often desirable with a two-bladed planer to operate with a smaller depth of cut in one direction of working than in the other.

The object of the present invention is to provide a coal planer in which the cut can be adjusted as desired and, to this end, in the planer frame is provided on its side facing the coal face with displaceable or interchangeable slide shoes. In this way, the possibility is obtained of optionally adjusting the depth of penetration of the cutting edges and, in particular, with a two-bladed planer, of adjusting each cutting edge independently. The cut can therefore be adjusted to any suitable dimension. It can be made greater in one direction and smaller in the other and it can also be arranged that the planer cuts only in one direction of movement and, with movement in the opposite direction, does not remove anything from the coal face.

The slide shoes may be provided with oblong holes so that it can be clamped to project any suitable distance beyond the planer frame. The planer itself does not have to be further adjusted. In the gallery, it can be empirically adapted to the given conditions so that a maximum of output is obtained without overloading the planer or the driving means. Once the most favourable cutting depth is fixed then a slide shoe adapted for use only for this cutting depth can be fitted and automatic shifting during working is thereby prevented.

It has been shown, however, that the permissible cutting depth, with equal power consumption, is entirely dependent upon the construction of the cutting edges. By means of extensive experiments, it was ascertained that a planer is very favourably disposed when it has several separate cutting edges arranged one above the other, these cutting edges being disposed step-wise in succession in the direction of movement of the planer in an approximately vertical plane lying almost parallel to the coal face.

One constructional form of the invention is shown, by way of example, in plan view in the accompanying drawing.

The planer comprises planer frame 10 on which there is arranged a blade carrier 11 provided with cutting blades 12 and 13. In the embodiment shown, the blade carrier 11 is pivotally mounted at 10b on the planer frame or base member 10 so that the same may tilt within a limited arc of pivot. Because of the pivotal mounting of the blade carrier 11, the forwardly facing blade 12 is always drawn forwardly in a direction towards the coal face 14 and the rearwardly facing blade 13 is swung out therefrom by a corresponding amount. As shown in the drawing, the blade carrier 11 is tilted to a maximum extent in the direction of the blades 12a and 12b. The tilting is automatically effected by the force of the cutting blades on the mine face. When the planer is drawn in the opposite direction, the blade carrier 11 will assume exactly the reverse position and the blades 13a and 13b will be tilted forward the same amount that the blades 12a and 12b are, as shown in the drawing. The swing of the blade carrier 11 is limited, for example, by stop-edges at the upper and lower end of its tilt as shown by 10a and 10c respectively in the drawing, the carrier 11 being shown abutting stop-edge 10c.

The coal planer is guided on a tube 15 which is arranged laterally on a conveyor 16, which, for example, due to pistons constantly under the pressure of compressed air, is forced over its whole length in the direction of the arrows 17, against the coal face. In this case, the cut, i. e. the depth of cut which is loosened each time the planer travels along the coal face 14, is determined by the distance which the forwardly-facing blade 12 in the direction of movement is from the surface over which the planer frame 10 bears on the coal face 14. In order to vary this distance, the planer frame 10, on its side facing the coal face, is provided with slide shoes 18 and 19, which are formed with oblong holes extending transversely of the longitudinal direction of the planer frame and through which fixing screws engage. The extent that the slide shoes 18 and 19 project from the planer frame may be adjusted and the slide shoes may be adjusted so that they project an amount as is indicated by the dotted lines at 19a. The planer frame is then supported in front of the coal face with that slide shoe 18 or 19 which is facing forward at the time. The further a slide shoe is moved forward, the smaller is its spacing from the blade, and therefore the smaller also is the width of the coal strip loosened by the blade. If the maximum width of the coal strip is fixed, then the adjustable slide shoes 18 and 19 can be replaced by shoes which cannot be adjusted and which therefore permanently maintain their positions relatively to the planer frame with certainty.

It is also to be noted that the advancement of the planer 10—12 in both directions of movement is effected by a planer chain 20, the return run 20a of which travels through the interior of the guide tube 15.

The two blades 12 and 13 of the planer are collectively defined by the bottom knives 12a and 13a, and a series of separate knives 12b and 13b. The associated cutting edges 12a and 12b, or 13a and 13b, lie one above the other in an almost vertical plane 21 and are staggered step-wise relatively to one another in the direction of movement of the planer. The lowest knives, i. e. the knives 12a and 13a, are disposed laterally outwardly to a greater extent than each of the knives positioned thereabove. Thus the bottom knife is longitudinally furthest from the center of the head and each knife in an upward direction is closer to the center of the head than the knife immediately therebelow. The plane 21 is either parallel to the coal face 14 or forms a small angle α of about 3° to 5° with the latter. Since the blade carrier 11 is pivotable, the positioning of the cutter knives thereon must take into consideration the pivoting of the head so that when the same is pivoted in cutting position, the plane 21 in which the knives lie will be parallel or form the small angle α of about 3–5°. The bottom knife 12a or 13a, slides along with a horizontal edge on the floor and has a vertical cutting edge. The horizontal edge is a cutting edge which serves to insure that the coal is cut cleanly from the mine floor. The vertical edge operates in the identical manner as the edges of the knives 12b and 13b and collectively define therewith the cutter.

The bottom knives 12a and 13a and also the other knives 12b and 13b are interchangeable. Each of these knives has a conical shank 22 which is inserted into the cutter holder 11 and can be released by driving in a wedge or key into an arranged aperture 23.

The member 25 is an after cutter attached to the upper surface of the carrier by the pivot pin 26 for engaging and tearing down overhanging coal.

What is claimed is:

1. In a coal-planing machine having a coal-planing head mounted on a planer frame to be drawn back and forth along a coal face for the cutting and automatic loading on to a conveyor of coal upon movement in each direction, the improvement which comprises a coal-planer cutter on each side of the coal-planing head collectively defined by a multiple number of individual knives, the individual knives on each side of the coal-planing head being staggered step-wise one above another with the lowest knife positioned longitudinally furthest from the center of the head and substantially positioned so that the cutting edges thereof are in a common vertical plane.

2. Improvement according to claim 1, in which said individual knives are provided with tapered shanks and positioned on said coal-planing head by insertion of said tapered shanks into passages defined in said coal-planing head.

3. Improvement according to claim 2, including at least one additional passage defined in said head for each passage for the insertion of said knife shanks, said additional passage being in communication with said first-mentioned passage at substantially right angles thereto for the insertion of a knife-removing member.

4. Improvement according to claim 1, in which the lowermost knife on each side of said planer head is dimentioned and positioned with a horizontal cutting edge at the bottom thereof and a vertical cutting edge in said common vertical plane.

5. Improvement according to claim 1, including a slide shoe positioned on each side of the planer frame for contact with the coal face in operation each slide shoe being adjustably positioned for varying the extent of projection thereof from said planer frame in the direction of the coal face.

6. Improvement according to claim 1, including a slide shoe positioned on each side of the planer frame for contact with the coal face in operation, each of said slide shoes being removable slide shoes for exchange with slide shoes of different size with respect to the extent of projection thereof from the planer frame in the direction of the coal face.

7. Improvement according to claim 1 in which said knives are so positioned on each side of the planer head that the cutter edge collectively defined thereby will form an angle of about 3° to 5° with the direction of movement of the planer when positioned for cutting actuation.

References Cited in the file of this patent

UNITED STATES PATENTS

| 2,539,962 | Mavor | Jan. 30, 1951 |

FOREIGN PATENTS

| 100,572 | France | Sept. 20, 1873 |
| 647,240 | France | July 24, 1928 |
| 901,915 | France | Nov. 20, 1944 |